(12) United States Patent
Burke et al.

(10) Patent No.: US 7,885,850 B2
(45) Date of Patent: *Feb. 8, 2011

(54) AUTOMATED FEEDBACK CANCELLATION IN A NETWORK-BASED TRANSACTION FACILITY

(75) Inventors: Brian Burke, San Jose, CA (US); Amjad Hanif, Santa Clara, CA (US); Jonathan Mark Logan, Millbrae, CA (US)

(73) Assignee: eBay Inc., San Jose, CA (US)

( * ) Notice: Subject to any disclaimer, the term of this patent is extended or adjusted under 35 U.S.C. 154(b) by 1258 days.

This patent is subject to a terminal disclaimer.

(21) Appl. No.: 11/241,008

(22) Filed: Sep. 30, 2005

(65) Prior Publication Data
US 2006/0064343 A1     Mar. 23, 2006

Related U.S. Application Data

(63) Continuation-in-part of application No. 10/749,736, filed on Dec. 30, 2003.

(60) Provisional application No. 60/524,348, filed on Nov. 20, 2003.

(51) Int. Cl.
    *G06F 17/30* (2006.01)
(52) U.S. Cl. ...................................... 705/10
(58) Field of Classification Search .................... 705/10
See application file for complete search history.

(56) References Cited

U.S. PATENT DOCUMENTS

| | | | |
|---|---|---|---|
| 5,285,496 A | 2/1994 | Frank et al. | |
| 5,583,763 A | 12/1996 | Atcheson et al. | |
| 5,659,366 A | 8/1997 | Kerman | |
| 5,669,877 A | 9/1997 | Blomquist | |
| 5,678,041 A | 10/1997 | Baker et al. | |

(Continued)

FOREIGN PATENT DOCUMENTS

WO     WO-0161601 A1     8/2001

(Continued)

OTHER PUBLICATIONS

"Preserving the Value of a Good Reputation—With iKarma.com; iKarma, Inc. Launches New Online Business Reputation Service." Business Wire, p. NA, Aug. 6, 2005.*

(Continued)

*Primary Examiner*—Susanna M Diaz
(74) *Attorney, Agent, or Firm*—Schwegman, Lundberg & Woessner, P.A.

(57) ABSTRACT

A request to cancel feedback pertaining to a transaction in a network-based transaction facility is generated when a user submitting the feedback has not participated in a dispute resolution process or other process of the facility. In another embodiment, a request to cancel such feedback is generated when a user submitting the feedback has been suspended from the facility within a certain time period of that user's initial use of the facility, or indefinitely suspended within a certain time period of leaving the feedback. In yet another embodiment, a user is required to view a tutorial before leaving his first negative or neutral feedback. In another embodiment, a user is presented with an interstitial page reminding him of the effects of leaving negative or neutral feedback.

31 Claims, 15 Drawing Sheets

| CONTENT | FROM | | DATE / TIME | ITEM# |
|---|---|---|---|---|
| 823 —⊕ GREAT ADDITION TO MY COLLECTION | BUYER | DAVEY118 (164*) | OCT-02-04 15:52 | 5515882824 |
| 823 —⊕ OK | BUYER | CINERAMA3 (544*) | SEP-30-04 16:37 | 3696978870 |
| 823 —⊕ TOP MANY THANKS | BUYER | FLINT-FLICKER (1710*) | SEP-20-04 06:23 | 3745290069 |
| 823 —⊕ WONDERFUL BOOKCASE! GREAT COMMUNICATION! THANKS!! | BUYER | KD54321 (318*) | SEP-27-04 21:51 | 4323727787 |
| 823 —⊕ JUST AS DESCRIBED; PROMPT DELIVERY | BUYER | GOLILLYO (100*) | SEP-27-04 01:02 | 8130111489 |
| ⊕ GOOD! | BUYER | DUFFMAN131313 (11*) | SEP-25-04 14:10 | 8130110436 |
| ⊕ GOOD TRANSCATION. A++ | SELLER | LAFAYETTE29 (2047*) | SEP-22-04 16:12 | 3263271510 |
| 824 —THE ITEM WAS DAMAGED WHEN I RECEIVED IT—820 | BUYER | HORRELL9 (1) | SEP-21-04 15:52 | 3744879879 |
| 821 — REPLY BY ROXANNYMAC: THE ITEM WAS FINE WHEN IT LEFT MY HOUSE. BUYER REFUSED TO PURCHASE SHIPPING INSURANCE | | | SEP-21-04 20:00 | |
| 822 — RATING WITHDRAWN BY SYSTEM ADMINISTRATOR. BUYER DIDN'T RESPOND TO THE UNPAID ITEM NOTIFICATION FOR THIS TRANSACTION. LEARN MORE | | | OCT-08-04 16:19 | |
| ⊕ GREAT DESCRIPTION OF ITEM AND GREAT COLLECTION! | BUYER | FLIPPY58 (45*) | SEP-21-04 05:47 | 8126869260 |
| ⊕ A++ FAST AT RESPONDING.... GREAT CUSTOMER!! | SELLER | KELLARY (7634*) | SEP-20-04 20:39 | 6922058481 |

U.S. PATENT DOCUMENTS

| | | | |
|---|---|---|---|
| 5,706,493 | A | 1/1998 | Sheppard, II |
| 5,706,507 | A | 1/1998 | Schloss |
| 5,708,829 | A | 1/1998 | Kadashevich et al. |
| 5,732,954 | A | 3/1998 | Strickler et al. |
| 5,737,479 | A | 4/1998 | Fujinami |
| 5,754,939 | A | 5/1998 | Herz et al. |
| 5,774,121 | A | 6/1998 | Stiegler |
| 5,778,135 | A | 7/1998 | Ottesen et al. |
| 5,781,246 | A | 7/1998 | Alten et al. |
| 5,787,253 | A | 7/1998 | McCreery et al. |
| 5,790,426 | A | 8/1998 | Robinson |
| 5,793,027 | A | 8/1998 | Baik |
| 5,799,304 | A | 8/1998 | Miller |
| 5,809,482 | A | 9/1998 | Strisower |
| 5,810,771 | A | 9/1998 | Blomquist |
| 5,822,123 | A | 10/1998 | Davis et al. |
| 5,828,419 | A | 10/1998 | Bruette et al. |
| 5,830,068 | A | 11/1998 | Brenner et al. |
| 5,832,472 | A | 11/1998 | Sheppard, II |
| 5,845,266 | A | 12/1998 | Lupien et al. |
| 5,848,396 | A | 12/1998 | Gerace |
| 5,862,230 | A | 1/1999 | Darby |
| 5,867,799 | A | 2/1999 | Lang et al. |
| 5,870,744 | A | 2/1999 | Sprague |
| 5,872,850 | A | 2/1999 | Klein et al. |
| 5,970,469 | A | 10/1999 | Scroggie et al. |
| 6,112,186 | A | 8/2000 | Bergh et al. |
| 6,134,548 | A | 10/2000 | Gottsman et al. |
| 6,327,574 | B1 | 12/2001 | Kramer et al. |
| 6,352,479 | B1 | 3/2002 | Sparks, II |
| 6,484,153 | B1 | 11/2002 | Walker et al. |
| 6,697,824 | B1 | 2/2004 | Bowman-Amuah |
| 6,810,408 | B1 | 10/2004 | Bates et al. |
| 7,124,112 | B1 * | 10/2006 | Guyan et al. .................. 705/44 |
| 7,428,505 | B1 * | 9/2008 | Levy et al. .................... 705/37 |
| 7,716,079 | B2 | 5/2010 | Hanif et al. |
| 2001/0032170 | A1 | 10/2001 | Sheth |
| 2002/0078152 | A1 | 6/2002 | Boone |
| 2003/0055898 | A1 | 3/2003 | Yeager et al. |
| 2004/0128155 | A1 * | 7/2004 | Vaidyanathan et al. ......... 705/1 |
| 2004/0128224 | A1 | 7/2004 | Dabney et al. |
| 2004/0205013 | A1 | 10/2004 | DeLaCruz |
| 2005/0114199 | A1 | 5/2005 | Hanif et al. |
| 2005/0125340 | A1 * | 6/2005 | Lin et al. ...................... 705/39 |
| 2005/0144052 | A1 | 6/2005 | Harding et al. |
| 2005/0192958 | A1 | 9/2005 | Widjojo et al. |
| 2005/0261919 | A1 * | 11/2005 | Kundtz et al. .................. 705/1 |
| 2005/0289039 | A1 * | 12/2005 | Greak .......................... 705/37 |
| 2006/0031177 | A1 * | 2/2006 | Rule ............................ 705/80 |
| 2006/0149745 | A1 * | 7/2006 | Mengerink .................... 707/10 |
| 2007/0005564 | A1 * | 1/2007 | Zehner .......................... 707/2 |
| 2007/0038506 | A1 * | 2/2007 | Noble et al. ................... 705/13 |

FOREIGN PATENT DOCUMENTS

| | | |
|---|---|---|
| WO | WO 01/65338 A2 * | 9/2001 |
| WO | WO-0165338 A2 | 9/2001 |
| WO | WO-2005052835 A1 | 6/2005 |

OTHER PUBLICATIONS eBay, eBay Feedback Removal Policy http://pages.ebay.com/help/community/fbremove.html, (Jun. 19, 2000).

"eBay, eBay Feedback Removal Policy", *Online-Internet Archive WaybackMachine-Retrieved on Feb. 14, 2005*, http://pages.ebay.com/help/community/fbremove.html,(Jun. 19, 2000).

"Square Trade, How Square Trade's Dispute Resolution Can Help Resolve Feedback Disputes", *Online-Internet Archive WaybackMachine-Retrieved on Feb. 14, 2005*, http://www.squaretrade.com/eb/ebay_nf_020801.html,(Mar. 12 & Jun. 18, 2001 & Aug. 8, 2002).

"SquareTrade, How SquareTrade's Dispute Resolution Can Help Resolve Feedback Disputes", http://www.squaretrade.com/eb/ebay_nf_020801.html, (Mar. 12, 2001).

Chicago Tribune, "Amazon.com expands into toys, electronics", *Chicago Tribune*, (Jul. 14, 1999),3;1.

Guglielmo, Connie, "BizRate Lets Consumers Rate Sites", *Interactive Week, 4(22)*, (Aug. 4, 1997).

MTB Review, "http://www.mtbr.com", http://www.mtbr.com, The attached mtrb.pdf which includes screen shots from a Mountain Biking Resource Review web site taken from the Wayback Machine Internet Archive located at http://www.archive.org/web/web.php., (Archived Jan. 25, 1997).

Wolverton, Troy, "Productopia launches product review site", CNET News.com, (Jul. 21, 1999).

"U.S. Appl. No. 10/749,736, Final Office Action mailed Jul. 28, 2006", 11 pgs.

"U.S. Appl. No. 10/749,736, Final Office Action mailed Sep. 1, 2005", 9 pgs.

"U.S. Appl. No. 10/749,736, Non Final Office Action mailed Feb. 3, 2006", 10 pgs.

"U.S. Appl. No. 10/749,736, Non Final Office Action mailed Feb. 16, 2005", 12 pgs.

"U.S. Appl. No. 10/749,736, Response filed Jan. 3, 2006 to Final Office Action mailed Sep. 1, 2005", 11 pgs.

"U.S. Appl. No. 10/749,736, Response filed Jun. 13, 2005 to Non Final Office Action mailed Feb. 16, 2005", 18 pgs.

"U.S. Appl. No. 10/749,736, Response filed Jul. 3, 2006 to Non Final Office Action mailed Feb. 3, 2006", 13 pgs.

"U.S. Appl. No. 11/027,782, Final Office Action mailed Nov. 19, 2007", 16 pgs.

"U.S. Appl. No. 11/027,782, Non-Final Office Action mailed May 2, 2008", 17 pgs.

"U.S. Appl. No. 11/027,782, Non-Final Office Action mailed May 15, 2007", 15 pgs.

"U.S. Appl. No. 11/027,782, Response filed Jan. 22, 2008 to Final Office Action mailed Nov. 19, 2007", 17 pgs.

"U.S. Appl. No. 11/027,782, Response filed Aug. 4, 2008 to Non-Final Office Action mailed May 2, 2008", 17 pgs.

"U.S. Appl. No. 11/027,782, Response filed Aug. 20, 2007 to Non-Final Office Action mailed May 15, 2007", 19 pgs.

"Ebay—What is Mutual Feedback Withdrawal?", [Online]. Retrieved from the Internet: <URL:http://pages.ebay.com/help/feedback/questions/mutual-withdrawal.html>, (Accessed Apr. 3, 2006), 6 pgs.

"Entry for "Withdraw"", *Merriam-Webster's Collegiate Thesaurus*, Property of U.S. Government, (1988), 859.

"European Application Serial No. 04819526.7, European Search Report mailed Jun. 17, 2008", 3 pgs.

"International Application Serial No. PCT/US04/38096, International Search Report mailed Mar. 16, 2005", 5 pgs.

"International Application Serial No. PCT/US04/38096, Written Opinion mailed Mar. 16, 2005", 8 pgs.

"U.S. Appl. No. 10/749,736, Appeal Brief filed Dec. 18, 2006", 23 pgs.

"U.S. Appl. No. 10/749,736, Examiner Interview Summary filed Jan. 2, 2009", 2 pgs.

"U.S. Appl. No. 10/749,736, Examiner Interview Summary mailed Dec. 2, 2008", 2 pgs.

"U.S. Appl. No. 10/749,736, Examiner Interview Summary mailed Dec. 10, 2008", 4 pgs.

"U.S. Appl. No. 10/749,736, Final Office Action mailed May 29, 2009", 9 pgs.

"U.S. Appl. No. 10/749,736, Non-Final Office Action mailed Jan. 8, 2009", 9 pgs.

"U.S. Appl. No. 10/749,736, Pre-Appeal Brief Request for Review filed Sep. 27, 2006", 5 pgs.

"U.S. Appl. No. 10/749,736, Response filed Apr. 7, 2009 to Non Final Office Action mailed Jan. 8, 2009", 13 pgs.

"U.S. Appl. No. 11/027,782, Advisory Action mailed Feb. 27, 2009", 3 pgs.

"U.S. Appl. No. 11/027,782, Final Office Action mailed on Nov. 24, 2008", 18 pgs.

"U.S. Appl. No. 11/027,782, Non-Final Office Action mailed Apr. 30, 2009", 19 pgs.

"U.S. Appl. No. 11/027,782, Response filed Jan. 26, 2009 to Final Office Action mailed Nov. 24, 2008", 15 pgs.

"European Application Serial No. 04519526.7, Office Action mailed Feb. 4, 2009", 6 pgs.

U.S. Appl. No. 10/749,736, Notice of Allowance mailed Sep. 14, 2009, 4 Pgs.

U.S. Appl. No. 10/749,736, Notice of Allowance mailed Dec. 24, 2009, 5 pgs.

U.S. Appl. No. 10/749,736, Response filed Aug. 31, 2009 to Final Office Action mailed May 29, 2009, 11 pgs.

U.S. Appl. No. 11/027,782, Final Office Action mailed Nov. 2, 2009, 18 pgs.

U.S. Appl. No. 11/027,782, Response filed Jan. 4, 2010 to Final Office Action mailed Nov. 2, 2009, 15 pgs.

U.S. Appl. No. 11/027,782, Response filed Jul. 30, 2009 to Non Final Office Action mailed Apr. 30, 2009, 17 pgs.

Chinese Application Serial No. 200480038176.0 Office Action Mailed Dec. 4, 2009, 2 pgs.

Cynthia, G, et al., ""Reputation in an Internet Auction Market,"", McDonald & V. Carlos Slawson, 2002. Economic Inquiry, Oxford University Press, vol. 40(4),, (renumbered pp. 1-18),, (Oct.), pp. 633-650.

U.S. Appl. No. 11/027,782, Advisory Action mailed Jan. 21, 2010, 2 pgs.

U.S. Appl. No. 11/027,782, Notice of Allowance mailed 04-02-1, 6 pgs.

European Application Serial No. 04819526.7, EPO Written Decision to Refuse mailed Jun. 2, 2010, 12 pgs.

European Application Serial No. 04819526.7, Summons to Attend Oral Proceedings mailed Jan. 28, 2010, 7 pgs.

* cited by examiner

| TRANSACTION_RECORD TABLE | | | | | | |
|---|---|---|---|---|---|---|
| TRANSACTION ID | END DATE | BIDDER (USER ID) | SELLER (USER ID) | ITEM NO# | TITLE | FEEDBACK |
| | | | | | | |
| 62 | 64 | 66 | 68 | 70 | 72 | 73 |

*FIG. 3*

| FEEDBACK TABLE | | | | |
|---|---|---|---|---|
| USER ID | TOTAL SCORE | TOTAL NEGATIVE | TOTAL POSITIVE | NO. OF RETRACTIONS |
| | | | | |
| 74 | 76 | 78 | 80 | 82 |

| FIG. 8A |
|---------|
| FIG. 8B |

HOME | PAY | REGISTER | SERVICES | SITE MAP

| BUY | SELL | COMMUNITY | HELP |

HELLO! SIGN OUT

HOME > COMMUNITY > FEEDBACK FORUM > LEAVE FEEDBACK > FEEDBACK TUTORIAL

MEMBER PROFILE: ROXANNYMAC (1677 ★)   ✹ POWER SELLER

MEMBER SINCE: SEP-27-98
LOCATION: UNITED STATES
* ID HISTORY
* ITEMS FOR SALE
* VISIT MY STORE
* ADD TO FAVORITE SELLERS
* LEARN MORE ABOUT ME ( CONTACT MEMBER )

{ 810
FEEDBACK SCORE:           1677
POSITIVE FEEDBACK:    814 — 99.6%           RECENT RATINGS:
                                             PAST    PAST 6   PAST 12
                                             MONTH   MONTHS   MONTHS
MEMBERS WHO LEFT A POSITIVE:  1683   811 — ⊕ POSITIVE   71      160     428
MEMBERS WHO LEFT A NEGATIVE:     6   812 — ⊖ NEUTRAL     0        0       0
ALL POSITIVE FEEDBACK RECEIVED: 1884 813 — ⊖ NEGATIVE    0        0       1

LEARN ABOUT WHAT THESE NUMBERS MEAN.    BID RETRACTIONS (PAST 6 MONTHS): 1

| FEEDBACK RECEIVED | FROM BUYERS | FROM SELLERS | LEFT FOR OTHERS |

1895 FEEDBACK RECEIVED BY ROXANNYMAC (2 MUTUALLY WITHDRAWN)

FIG. 8A

| CONTENT | FROM | | DATE / TIME | ITEM # |
|---|---|---|---|---|
| 823 — ⊕ GREAT ADDITION TO MY COLLECTION | BUYER | DAVEY118 (164*) | OCT-02-04 15:52 | 5515882824 |
| 823 — ⊕ OK | BUYER | CINERAMA3 (544*) | SEP-30-04 16:37 | 3696978870 |
| 823 — ⊕ TOP MANY THANKS | BUYER | FLINT-FLICKER (1710*) | SEP-20-04 06:23 | 3745290069 |
| 823 — ⊕ WONDERFUL BOOKCASE! GREAT COMMUNICATION! THANKS!! | BUYER | KD54321 (318*) | SEP-27-04 21:51 | 4323727787 |
| 823 — ⊕ JUST AS DESCRIBED; PROMPT DELIVERY | BUYER | GOLILLYO (100*) | SEP-27-04 01:02 | 8130111489 |
| ⊕ GOOD! | BUYER | DUFFMAN131313 (11*) | SEP-25-04 14:10 | 8130110436 |
| ⊖ GOOD TRANSCATION. A++ | SELLER | LAFAYETTE29 (2047*) | SEP-22-04 16:12 | 3263271510 |
| 824 — THE ITEM WAS DAMAGED WHEN I RECEIVED IT ~ 820 | BUYER | HORRELL9 (!) | SEP-21-04 15:52 | 3744879879 |
| 821 — REPLY BY ROXANNYMAC: THE ITEM WAS FINE WHEN IT LEFT MY HOUSE. BUYER REFUSED TO PURCHASE SHIPPING INSURANCE | | | SEP-21-04 20:00 | |
| 822 — RATING WITHDRAWN BY SYSTEM ADMINISTRATOR. BUYER DIDN'T RESPOND TO THE UNPAID ITEM NOTIFICATION FOR THIS TRANSACTION. LEARN MORE | | | OCT-08-04 16:19 | |
| ⊕ GREAT DESCRIPTION OF ITEM AND GREAT COLLECTION! | BUYER | FLIPPY58 (45*) | SEP-21-04 05:47 | 8126869260 |
| ⊕ A++ FAST AT RESPONDING.... GREAT CUSTOMER!! | SELLER | KELLARY (7634*) | SEP-20-04 20:39 | 6922058481 |

*FIG. 8B*

HOME | PAY | SERVICES | SITE MAP

| BUY | SELL | COMMUNITY | HELP |

HOME > COMMUNITY > FEEDBACK FORUM > LEAVE FEEDBACK > FEEDBACK TUTORIAL

FEEDBACK FORUM : FEEDBACK TUTORIAL

SINCE THIS IS THE FIRST TIME YOU'RE LEAVING A NEUTRAL OR NEGATIVE FEEDBACK COMMENT, PLEASE TAKE OUR BRIEF TUTORIAL ON THE FEEDBACK SYSTEM. THIS TUTORIAL WILL SHOW YOU:

> HOW YOU CAN USE THE FEEDBACK SYSTEM
> HOW YOU CAN USE COMMUNICATION TOOLS BEFORE LEAVING FEEDBACK

THIS TUTORIAL HAS 3 QUESTIONS AND SHOULD TAKE 2-3 MINUTES TO COMPLETE. YOU WILL ONLY NEED TO TAKE THE TUTORIAL ONCE. WHEN YOU'RE DONE, YOU SHOULD HAVE A MUCH BETTER UNDERSTANDING OF THE FEEDBACK SYSTEM.

———————————————— PAGE 1 - LAUNCH PAGE ————————————————

( CONTINUE )

FEEDBACK FORUM | DISCUSSION BOARDS | GROUPS | ANSWER CENTER | CHAT ROOMS | COMMUNITY VALUES | ANNOUNCEMENTS | SECURITY CENTER | POLICIES | SITE MAP | HELP

*FIG. 9A*

HOME | PAY | SERVICES | SITE MAP

| BUY | SELL | COMMUNITY | HELP |

HOME > COMMUNITY > FEEDBACK FORUM > LEAVE FEEDBACK > FEEDBACK TUTORIAL

FEEDBACK FORUM : FEEDBACK TUTORIAL

FEEDBACK TUTORIAL

INTRODUCTION                                              ← PREVIOUS

WHAT IS FEEDBACK?
FEEDBACK IS MADE UP OF COMMENTS AND RATINGS LEFT BY OTHER MEMBERS FROM WHOM YOU'VE BOUGHT OR TO WHOM YOU'VE SOLD. THESE COMMENTS AND RATINGS ARE VALUABLE INDICATORS OF YOUR REPUTATION AS A BUYER OR SELLER. THERE ARE THREE TYPES OF FEEDBACK RATINGS: POSITIVE, NEUTRAL AND NEGATIVE. THE SUM OF THESE FEEDBACK RATINGS ARE SHOWN AS A NUMBER IN PARENTHESES NEXT TO YOUR USER ID.
HOW FEEDBACK WORKS
> EACH MEMBER MAY AFFECT YOUR SCORE BY ONLY ONE POINT (POSITIVE OR NEGATIVE). HOWEVER, THEY MAY LEAVE YOU ONE FEEDBACK RATING AND COMMENT FOR EACH TRANSACTION THEY HAVE WITH YOU.
> YOU RECEIVE A FEEDBACK STAR ONCE YOUR FEEDBACK SCORE REACHES 10 POINTS.
> YOU SHOULD LEAVE FEEDBACK AFTER EACH TRANSACTION IS COMPLETE SO THAT OTHER MEMBERS MAY BENEFIT FROM YOUR EXPERIENCE.
> A HIGH FEEDBACK SCORE AND PERCENTAGE IS USUALLY A GOOD SIGN, BUT YOU SHOULD ALWAYS CHECK YOUR TRADING PARTNER'S MEMBER PROFILE TO READ COMMENTS AND LOOK FOR NEGATIVE REMARKS.
READY TO TAKE THE TUTORIAL?
THERE'S ONE THING WE NEED TO TELL YOU: THE INFORMATION IN THIS TUTORIAL SHOULD NOT BE THOUGHT OF AS LEGAL ADVICE. IF YOU HAVE A SPECIFIC QUESTION ABOUT WHETHER YOUR FEEDBACK COMMENT MAY VIOLATE THE POLICY OR COULD BE CONSIDERED LIBELOUS, YOU SHOULD CONTACT A LAWYER.

TAKE THE QUIZ!

FEEDBACK FORUM | DISCUSSION BOARDS | GROUPS | ANSWER CENTER | CHAT ROOMS | COMMUNITY VALUES
| ANNOUNCEMENTS | SECURITY CENTER | POLICIES | SITE MAP | HELP

*FIG. 9B*

HOME | PAY | SERVICES | SITE MAP

| BUY | SELL | COMMUNITY | HELP |

HOME > COMMUNITY > FEEDBACK FORUM > LEAVE FEEDBACK > FEEDBACK TUTORIAL

FEEDBACK TUTORIAL

QUESTION: 1 OF 3       ← PREVIOUS | NEXT →

WHENEVER YOU LEAVE FEEDBACK, USE CAUTION AND GOOD JUDGMENT. COMMENTS MAY NOT BE CHANGED, EDITED OR REMOVED.

QUESTION

STEVE DIDN'T RECEIVE AN ITEM HE PAID FOR. SO HE LEFT NEGATIVE FEEDBACK. THE NEXT DAY, HE RECEIVED THE ITEM IN THE MAIL. NOW HE WANTS TO CHANGE THE FEEDBACK. WHAT CAN HE DO?

○ CHANGE A NEGATIVE RATING TO A POSITIVE RATING

○ CHANGE THE COMMENT WITHOUT AGREEING WITH HIS TRADING PARTNER TO WITHDRAW THE FEEDBACK

○ REMOVE THE RATING AND COMMENT

○ ALL OF THE ABOVE

○ NONE OF THE ABOVE

[ SUBMIT ]

PAGE 3
-QUESTION 1

QUESTION: 1 OF 3       ← PREVIOUS | NEXT →

FEEDBACK FORUM | DISCUSSION BOARDS | GROUPS | ANSWER CENTER | CHAT ROOMS | COMMUNITY VALUES |
ANNOUNCEMENTS | SECURITY CENTER | POLICIES | SITE MAP | HELP

*FIG. 9C*

HOME | PAY | SERVICES | SITE MAP

| BUY | SELL | COMMUNITY | HELP |

HOME > COMMUNITY > FEEDBACK FORUM > LEAVE FEEDBACK > FEEDBACK TUTORIAL

FEEDBACK TUTORIAL

QUESTION: 1 OF 3      ⬅ PREVIOUS | NEXT ➡

WHENEVER YOU LEAVE FEEDBACK, USE CAUTION AND GOOD JUDGMENT. COMMENTS MAY NOT BE CHANGED, EDITED OR REMOVED.

QUESTION

STEVE DIDN'T RECEIVE AN ITEM HE PAID FOR. SO HE LEFT NEGATIVE FEEDBACK. THE NEXT DAY, HE RECEIVED THE ITEM IN THE MAIL. NOW HE WANTS TO CHANGE THE FEEDBACK. WHAT CAN HE DO?

○ CHANGE A NEGATIVE RATING TO A POSITIVE RATING

○ CHANGE THE COMMENT WITHOUT AGREEING WITH HIS TRADING PARTNER TO WITHDRAW THE FEEDBACK

○ REMOVE THE RATING AND COMMENT

○ ALL OF THE ABOVE

⦿ NONE OF THE ABOVE

[ SUBMIT ]

ANSWER

CORRECT!
THAT'S RIGHT ! ONCE YOU LEAVE FEEDBACK FOR ANOTHER MEMBER YOU MAY NOT EDIT THE COMMENT, CHANGE THE RATING OR REMOVE THE RATING AND COMMENT.

THE ONLY EXCEPTION IS IF BOTH YOU AND THE OTHER MEMBER MUTUALLY AGREE TO WITHDRAW THE FEEDBACK. IN THIS INSTANCE THE RATING IS REMOVED, BUT THE COMMENT REMAINS.

CLICK NEXT TO MOVE ON TO THE NEXT QUESTION.

QUESTION: 1 OF 3      ⬅ PREVIOUS | NEXT ➡

FEEDBACK FORUM | DISCUSSION BOARDS | GROUPS | ANSWER CENTER | CHAT ROOMS | COMMUNITY VALUES | ANNOUNCEMENTS | SECURITY CENTER | POLICIES | SITE MAP | HELP

*FIG. 9D*

HOME | PAY | SERVICES | SITE MAP

| BUY | SELL | COMMUNITY | HELP |

HOME > COMMUNITY > FEEDBACK FORUM > LEAVE FEEDBACK > FEEDBACK TUTORIAL

FEEDBACK TUTORIAL

QUESTION: 1 OF 3                            ⬅ PREVIOUS | NEXT ➡

WHENEVER YOU LEAVE FEEDBACK, USE CAUTION AND GOOD JUDGMENT. COMMENTS MAY NOT BE CHANGED, EDITED OR REMOVED.

QUESTION

STEVE DIDN'T RECEIVE AN ITEM HE PAID FOR. SO HE LEFT NEGATIVE FEEDBACK. THE NEXT DAY, HE RECEIVED THE ITEM IN THE MAIL. NOW HE WANTS TO CHANGE THE FEEDBACK. WHAT CAN HE DO?

○ CHANGE A NEGATIVE RATING TO A POSITIVE RATING

○ CHANGE THE COMMENT WITHOUT AGREEING WITH HIS TRADING PARTNER TO WITHDRAW THE FEEDBACK

○ REMOVE THE RATING AND COMMENT

○ ALL OF THE ABOVE

○ NONE OF THE ABOVE

SUBMIT

ANSWER

INCORRECT!
SORRY – THAT'S NOT THE RIGHT ANSWER. CLICK NEXT TO FIND OUT WHY.

PAGE 4B – QUESTION 1 INCORRECT

QUESTION: 1 OF 3                            ⬅ PREVIOUS | NEXT ➡

FEEDBACK FORUM | DISCUSSION BOARDS | GROUPS | ANSWER CENTER | CHAT ROOMS | COMMUNITY VALUES
| ANNOUNCEMENTS | SECURITY CENTER | POLICIES | SITE MAP | HELP

*FIG. 9E*

HOME | PAY | SERVICES | SITE MAP

| BUY | SELL | COMMUNITY | HELP |

HOME > COMMUNITY > FEEDBACK FORUM > LEAVE FEEDBACK > FEEDBACK TUTORIAL

FEEDBACK TUTORIAL

QUESTION: 1 OF 3                              PREVIOUS | NEXT

WHENEVER YOU LEAVE FEEDBACK, USE CAUTION AND GOOD JUDGMENT. COMMENTS MAY NOT BE CHANGED, EDITED OR REMOVED.

QUESTION: 1 OF 3 ANSWER EXPLAINED

WE'D LIKE TO HELP YOU UNDERSTAND HOW YOU CAN AVOID THIS MISTAKE IN THE FUTURE

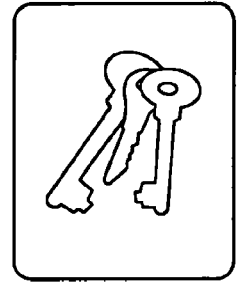

ONCE YOU LEAVE FEEDBACK FOR ANOTHER MEMBER YOU MAY NOT EDIT THE COMMENT, CHANGE THE RATING OR REMOVE THE RATING AND COMMENT. THE ONLY EXCEPTION IS IF BOTH YOU AND THE OTHER MEMBER MUTUALLY AGREE TO WITHDRAW THE FEEDBACK. IN THIS INSTANCE THE RATING IS REMOVED, BUT THE COMMENT REMAINS.

SINCE FEEDBACK BECOMES A PERMANENT PART OF A MEMBER'S REPUTATION, WE ENCOURAGE MEMBERS TO USE GOOD JUDGMENT WHENEVER LEAVING FEEDBACK.

CLICK NEXT TO MOVE ON TO THE NEXT QUESTION.

PAGE 4B.2 - QUESTION 1 INCORRECT

QUESTION: 1 OF 3                              PREVIOUS | NEXT

FEEDBACK FORUM | DISCUSSION BOARDS | GROUPS | ANSWER CENTER | CHAT ROOMS | COMMUNITY VALUES | ANNOUNCEMENTS | SECURITY CENTER | POLICIES | SITE MAP | HELP

*FIG. 9F*

HOME | PAY | SERVICES | SITE MAP

| BUY | SELL | COMMUNITY | HELP |

HOME > COMMUNITY > FEEDBACK FORUM > LEAVE FEEDBACK

▷ THE FEEDBACK YOU ARE ABOUT TO LEAVE CANNOT BE RETRACTED.

BEFORE YOU LEAVE A NEGATIVE OR NEUTRAL FEEDBACK, PLEASE TAKE THE FOLLOWING STEPS:
> ALLOW ADEQUATE TIME
  * REGULAR DOMESTIC MAIL CAN TAKE UP TWO WEEKS; INTERNATIONAL MAIL CAN TAKE EVEN LONGER.
  * MEDIA MAIL CAN TAKE FOUR TO SIX WEEKS.
  * SELLERS CAN'T SHIP AN ITEM UNTIL PAYMENT CLEARS, WHICH CAN TAKE UPTO TEN DAYS.
  * SOME BUSINESSES ARE CLOSED ON WEEKENDS.

> CONTACT YOUR TRADING PARTNER
  * SEND AN EMAIL USING CONTACT A MEMBER.
  * REQUEST CONTACT INFORMATION AND CALL YOUR TRADING PARTNER.

WE ALSO RECOMMEND USING SQUARE TRADE, AN ONLINE MEDIATION SERVICE, TO TRY TO RESOLVE TRANSACTION DISPUTES.
REMEMBER, BOTH MEMBERS MAY LEAVE FEEDBACK ABOUT THE TRANSACTION. IF YOU MUST LEAVE A NEGATIVE COMMENT, PLEASE KEEP YOUR COMMENTS FACTUAL AND AVOID PERSONAL REMARKS.

TO LEARN MORE, TAKE A TUTORIAL ABOUT FEEDBACK.

( CONTINUE AND LEAVE FEEDBACK )    EDIT FEEDBACK

FEEDBACK FORUM | DISCUSSION BOARDS | GROUPS | ANSWER CENTER | CHAT ROOMS | COMMUNITY VALUES | ANNOUNCEMENTS | SECURITY CENTER | POLICIES | SITE MAP | HELP

*FIG. 10*

AUTOMATED FEEDBACK CANCELLATION IN A NETWORK-BASED TRANSACTION FACILITY

This application is a Continuation-In-Part of and claims priority from U.S. application Ser. No. 10/749,736, filed Dec. 30, 2003, which claims priority from U.S. Provisional Application Ser. No. 60/524,348, filed Nov. 20, 2003, which applications are incorporated herein by reference.

TECHNICAL FIELD

The present application relates generally to the field of network data communications, and in particular, but not by way of limitation, to feedback submitted by users of a network-based transaction facility.

BACKGROUND

In addition to access convenience, one of the advantages offered by network-based transaction facilities (e.g., business-to-business, business-to-consumer and consumer-to-consumer Internet marketplaces and retailers) and on-line communities is that participants within such facilities or communities may provide feedback to the facility, to other users of the facility and to members of an on-line community regarding any number of topics.

For users of a network-based transaction facility, such as an Internet-based auction facility, feedback regarding other users is particularly important for enhancing user trust of the transaction facility. Indeed, a history of positive feedback for a trader that routinely uses an Internet-based auction facility may be particularly valuable and useful in providing other traders with a degree of confidence regarding a specific trader. Accordingly, a positive feedback history may establish the credibility and trustworthiness of a particular trader within an on-line trading community. Similarly, a history of negative feedback may discourage other traders from transacting with a specific trader.

BRIEF DESCRIPTION OF THE DRAWINGS

Embodiments of the present invention is illustrated by way of example and not limitation in the figures of the accompanying drawings, in which like references indicate similar elements and in which:

FIG. 3 is a diagrammatic representation of an exemplary transaction record table of the database illustrated in FIG. 2.

FIG. 4 is a diagrammatic representation of an exemplary feedback table of the database illustrated in FIG. 2.

FIGS. 8A and 8B are an exemplary embodiment of a user interface conveying feedback statistics and an example of withdrawn feedback.

FIGS. 9A-9F illustrate an example of a user tutorial.

FIG. 10 is an example of an interstitial page informing the user of the effect of negative and neutral feedback.

DETAILED DESCRIPTION

A method and system for removing feedback in a network-based transaction facility are described. In the following description, for purposes of explanation, numerous specific details are set forth in order to provide a thorough understanding of the present invention. It will be evident, however, to one skilled in the art that the present invention may be practiced without these specific details.

Terminology

For the purposes of the present specification, the term "transaction" shall be taken to include any communications between two or more entities and shall be construed to include, but not be limited to, commercial transactions including sale and purchase transactions, auctions and the like.

Transaction Facility

Figure 1:
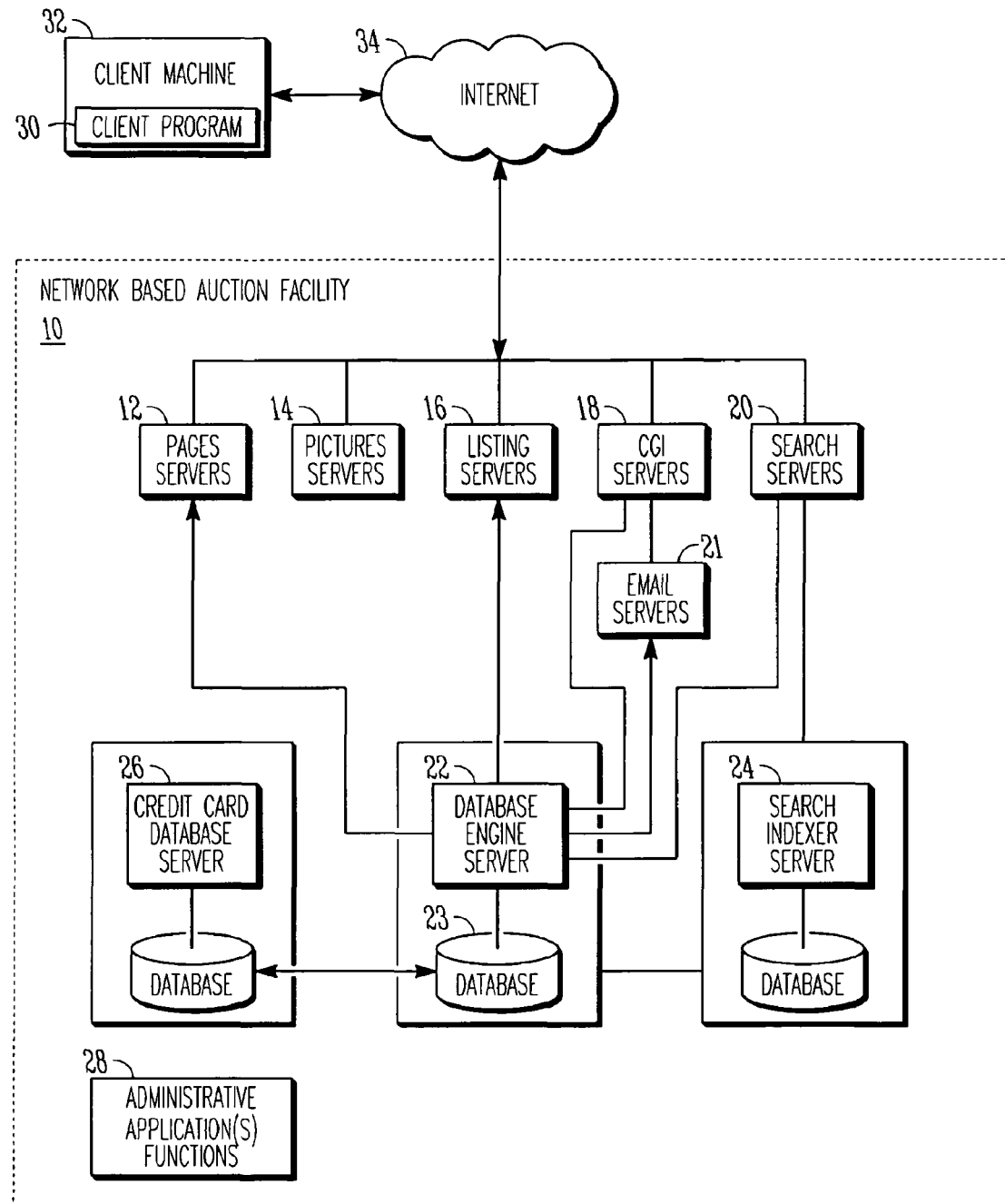
FIG. 1 is a block diagram illustrating an exemplary network-based transaction facility in the form of an internet-based auction facility.

FIG. 1 is block diagram illustrating an exemplary network-based transaction facility 10 (e.g., a multi-seller electronic marketplace) that includes one or more of a number of types of front-end servers, namely page servers 12 that deliver web pages (e.g., markup language documents), picture servers 14 that dynamically deliver images to be displayed within Web pages, listing servers 16, CGI servers 18 that provide an intelligent interface to the back-end of facility 10, and search servers 20 that handle search requests to the facility 10. E-mail servers 21 provide, inter alia, automated e-mail communications to users of the facility 10.

The back-end servers include a database engine server 22, a search index server 24 and a credit card database server 26, each of which maintains and facilitates access to a respective database.

The facility 10 may be accessed by a client program 30, such as a browser (e.g., the Internet Explorer distributed by Microsoft Corp. of Redmond, Wash.) that executes on a client machine 32 and accesses the facility 10 via a network such as, for example, the Internet 34. Other examples of networks that a client may utilize to access the auction facility 10 include a wide area network (WAN), a local area network (LAN), a wireless network (e.g., a cellular network), or the Plain Old Telephone Service (POTS) network.

Database Structure

Figure 2:
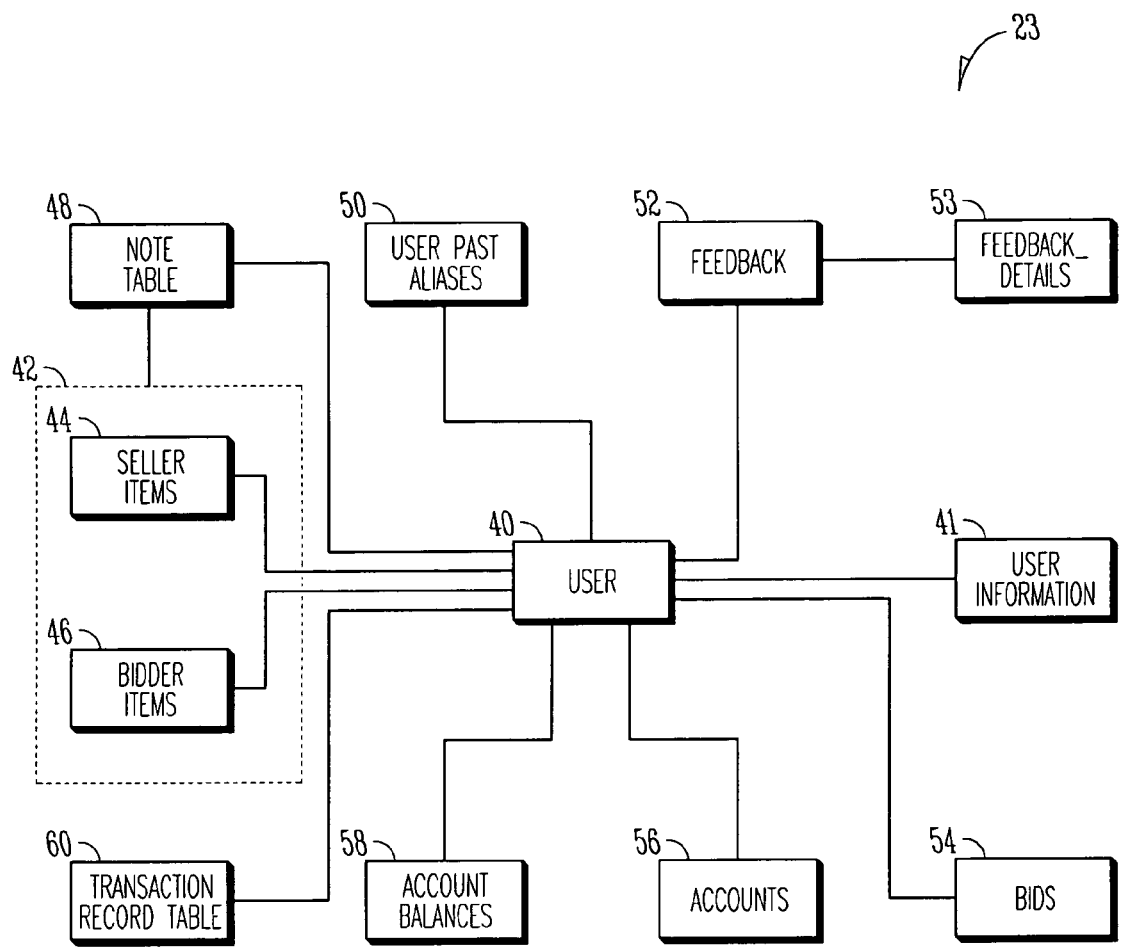
FIG. 2 is a database diagram illustrating an exemplary database for the transaction facility.

FIG. 2 is a database diagram illustrating an exemplary database 23, maintained by and accessed via the database engine server 22, which at least partially implements and supports the network-based transaction facility 10 such as an Internet-based auction facility. It should be noted that while some embodiments of the present invention are described in the context of an auction facility, it will be appreciated by those skilled in the art that other embodiments of the invention will find application in many different types of computer-based, and network-based, commerce facilities.

The database 23 may, in one embodiment, be implemented as a relational database, and may include a number of tables having entries, or records, that are linked by indices and keys. In an alternative embodiment, the database 23 may be implemented as a collection of objects in an object-oriented database.

Central to the database 23 is a user table 40, which contains a record for each user of the network-based transaction facility 10 such as an Internet-based auction facility. A user may operate as a seller, a buyer, or both, within the facility 10. The database 23 also includes item tables 42 that may be linked to the user table 40. Specifically, the tables 42 include a seller items table 44 and a bidder items table 46. A user record in the user table 40 may be linked to multiple items that are being, or have been, auctioned via the facility 10. A link indicates whether the user is a seller or a buyer with respect to items for which records exist within the item tables 42. The database 23 also includes a note table 48 populated with note records that may be linked to one or more item records within the item tables 42 and/or to one or more user records within the user table 40. Each note record within the table 48 may include, inter alia, a comment, description, history or other information pertaining to an item being offered via the facility 10, or to a user of the facility 10.

A number of other tables are also shown to be linked to the user table 40, namely a user past aliases table 50, a feedback table 52, a feedback details table 53, a bids table 54, an accounts table 56, an account balances table 58 and a transaction record table 60.

FIG. 3 is a diagrammatic representation of an exemplary embodiment of the transaction record table 60 that is populated with records, or entries, for completed, or ended, transactions (e.g., auctions) that have been facilitated by the facility 10. The table 60 includes a transaction identifier column 62 that stores a unique transaction identifier for each entry, and an end date column 64 that stores a date value indicating, for example, a date on which a transaction was established. A bidder column 66 stores a user identifier for a bidder (or a purchaser), the user identifier comprising a pointer to further user information stored in the user table 40. Similarly, a seller column 68 stores, for each entry, a user identifier for a seller within the relevant transaction. An item number column 70 stores, for each entry, an item number identifying the goods or service being transacted, and a title column 72 stores, for each entry, a descriptive title for the relevant transaction or for the item being transacted. A feedback column 73 stores, for each entry, data specifying whether feedback exists for the relevant transaction and whether this feedback is current (i.e., has not been removed or withdrawn).

It should be noted that, in one embodiment, an entry is only created in the transaction record table 60 for transactions that have been established, for example, by the conclusion of an auction process, or by some other offer and acceptance mechanism between the purchaser and the seller.

FIG. 4 is a diagrammatic representation of an exemplary embodiment of the feedback table 52. The feedback table 52 stores summary information regarding feedback for users of the facility 10. The table 52 includes a user identifier column 74 that stores, for each entry, a user identifier providing a pointer to the user table 40. A total score column 76 stores, for each user entry, a feedback score calculated by subtracting the total number of negative feedback comments received for the relevant user from the total number of positive feedback comments received for that user. A total negative column 78 stores, for each user entry, the total number of negative feedback comments for the relevant user, and a total positive column 80 similarly stores, for each user entry, the total number of positive feedback comments received for that user. A number of retractions column 82 stores, for each user entry, the number of bids that the relevant user has retracted from auctions.

Figures 5, 6:
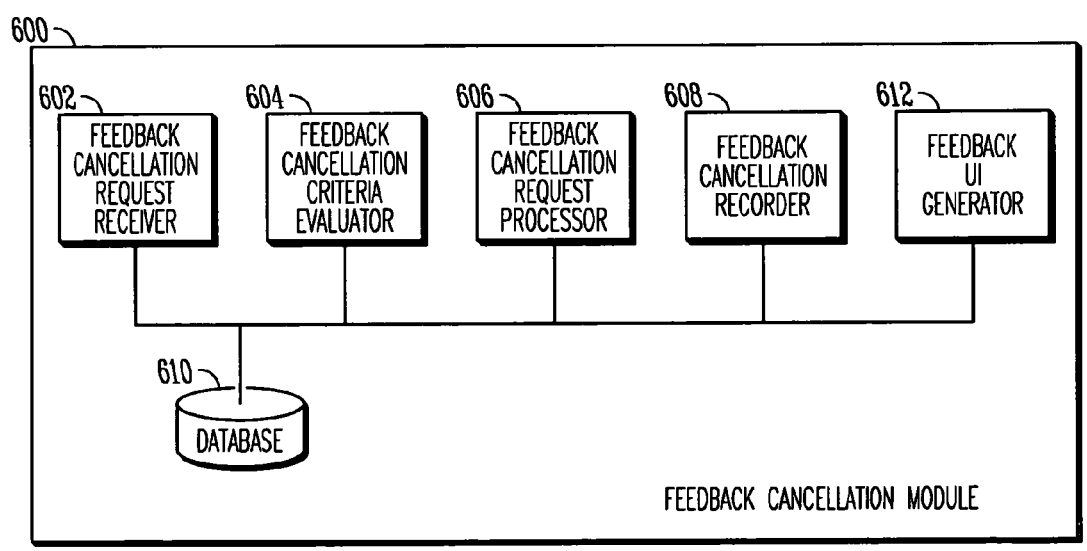
FIG. 5 is a diagrammatic representation of an exemplary feedback details table of the database illustrated in FIG. 2.
FIG. 6 is a block diagram of one embodiment of a feedback cancellation module.

FIG. 5 is a diagrammatic representation of one embodiment of the feedback details table 53, that is populated with entries reflecting the details of each feedback comment or opinion submitted by a user to the facility 10 regarding another user or item involved in a transaction. In one exemplary embodiment, users are only permitted to provide feedback pertaining to a transaction upon conclusion of that transaction. The feedback information may pertain to the other user that participated in the transaction, or to the object (e.g., goods or services) that was the subject of the transaction. In an alternative embodiment, comments or opinions are provided regarding an item or service that is offered for sale or regarding an event. In these cases it will be appreciated that a transaction is necessarily required for feedback to be permitted.

The feedback details table 53 includes an item number column 104 including an item identifier that points to a record within the item tables 42. A comment column 106 stores, for each entry, the actual text of the feedback, comment, or opinion. A type column 108, in one embodiment, stores an indication as to whether the comment is positive, negative, neutral, withdrawn, removed, or non-scoring. The data in the type column 108 permits the system to determine if feedback has been withdrawn because of agreement by the parties involved in a transaction, or removed and/or marked as non-scoring by the administrator of the network-based transaction facility 10 because the user who submitted the feedback has failed to follow a particular protocol of the facility (such as failing to participate in an online dispute resolution procedure). A date column 110 stores, for each entry, the date on which the feedback, comment or opinion was delivered. A response column 112 stores the text of a response submitted by a user (e.g., a user to which the original comment pertained) in response to the comment text stored in column 106. Similarly, a rebuttal column 114 stores the text of a rebuttal to such a response.

A feedback provider column 116 stores the user identifier of the user that submitted the original comment, stored in column 106, for the entry. A commentee column 118 stores the user identifier of the user to which comment may have been directed.

The feedback details table 53 also includes a withdrawal date column 120 that stores, for each withdrawn feedback comment, the date on which this feedback comment was withdrawn, removed, or marked as non-scoring.

It will be appreciated that further dates and other descriptive information may also populate the feedback details table 53.

Feedback Cancellation

Users of the network-based transaction facility 10 are allowed to leave feedback for other users. Feedback provides users of the transaction facility 10 with a degree of confidence regarding a specific user. That is, a positive feedback history may establish the credibility and trustworthiness of a particular user within the transaction facility 10. Similarly, a history of negative feedback may discourage other users from transacting with a specific user. However, for a multitude of reasons, the administrator of the network-based transaction facility may want to cancel feedback. Canceling feedback may involve removing feedback or marking feedback as non-scoring. In an embodiment, the effect of marking feedback as non-scoring is that the comments for the feedback are displayed for other users of the facility 10 to view, but such feedback does not affect the positive, negative or neutral scores of the user to whom the comment is directed. In another embodiment, removed feedback does not affect the positive, negative or neutral scores of a user, and the feedback comment is not displayed for viewing by other users. In one or more embodiments, the transaction facility 10 may be programmed to remove/non-score feedback from users who have failed to properly participate in the network-based transaction facility, or to remove/non-score feedback from users who have been suspended from the use of the network-based transaction facility. Embodiments of the present invention provide a mechanism for removing/non-scoring feedback in such situations. In other embodiments of the invention, a user is required to complete a brief tutorial before the user records his or her first negative or neutral feedback. The tutorial, inter alia, suggests alternative means for resolving the dispute in lieu of leaving negative or neutral feedback. In another embodiment, if a user wants to leave negative or neutral feedback, and that user has previously completed the tutorial, an interstitial page is displayed to the user to remind the user of the effect of negative and neutral feedback, and to remind the user of alternative dispute resolution means, before that user records the negative or neutral feedback.

In one embodiment, the transaction facility 10 implements the removal of feedback through a feedback cancellation module. The feedback cancellation module is responsible for removing feedback comments previously left by users of the transaction facility 10. In this embodiment, the feedback is removed based on criteria programmed into the facility 10. FIG. 6 is a block diagram of one embodiment of a feedback cancellation module 600.

Referring to FIG. 6, the feedback cancellation module 600 includes a feedback cancellation request receiver 602, a feedback cancellation criteria evaluator 604, a feedback cancellation request processor 606, a feedback cancellation recorder 608, a feedback user interface (UI) generator 612, and a database 610. The feedback cancellation request receiver 602 is responsible for receiving a request to remove/non-score feedback. In an embodiment, after a user has submitted feedback, if it is determined that that feedback should be removed/non-scored, the cancellation request receiver 602 performs several functions. The cancellation request receiver 602 may identify the transaction identified with the feedback, and may further identify the parties involved in that transaction. The feedback to be removed/non-scored may include feedback comments left by either party to the transaction. In an embodiment, the transaction is identified using an item number specified by a user who submits the feedback.

The feedback cancellation criteria evaluator 604 is responsible for implementing the algorithm that determines whether feedback should be removed/non-scored. In an embodiment, this removal/non-scoring is based on a set of feedback cancellation criteria that encompasses various rules for removing/non-scoring feedback in the transaction facility 10. The rules may require, for example, that members or users of the facility 10 participate in an online dispute resolution process. If a user has not participated in such a dispute resolution process relating to a particular transaction, any feedback left by that user relating to that transaction may be removed/non-scored. The rules may further require, for example, that if a user has been suspended from using the transaction facility 10 within a certain time period (e.g., 90 days) of his or her initial use of the transaction facility, or a user has been indefinitely suspended within a certain time period (e.g., 90 days) of leaving the feedback, any feedback left by that user will be removed/non-scored. In an embodiment, an indefinite suspension is applied for relatively serious violations by a user, and such indefinite suspensions do not have to occur within a certain time period of the user's initial activity to the indefinite suspension to trigger removal/non-scoring of feedback.

In an embodiment, feedback may be removed/non-scored if a user has not participated in dispute resolution procedures that, for the purposes of the present disclosure, may be referred to as Item Not Received (INR) and UnPaid Item (UPI) procedures. In an example embodiment of an INR procedure, a user may inform the administrator of the transaction facility 10 that he ordered and paid for an item, but did not receive the item. The administrator of the transaction facility 10 may then contact the seller to determine the reason for the non-delivery of the item. Thereafter, there may be further give and take among the buyer, seller, and administrator, and/or other procedures to settle the dispute. After a certain time period however, in one embodiment, the user who did not receive the item can indicate to the administrator of the transaction facility that he would liked to be reimbursed for this item that he did not receive, and the administrator may honor that request.

In an example embodiment of the UPI procedure, a user may purchase an item through the transaction facility 10, and indicate that payment will be transmitted to the seller (e.g., by sending a personal check). If the buyer does not transmit the payment to the seller, the seller can inform the administrator about this UnPaid Item (UPI). The administrator may then contact the buyer to determine the reason for the absence of payment, and may participate in further actions/negotiations in an attempt to settle the dispute. In another embodiment, if the buyer does not pay for the item within a certain period of time, the administrator of the transaction facility 10 may make a payment to the seller to compensate that seller for the transaction costs incurred by this seller for this UnPaid Item.

If at some point of the INR, UPI, or other dispute resolution process, it is determined that a user is not properly participating in the process, it can be indicated in the transaction facility 10 that this user has failed to participate in a required process, and any feedback left by that user may be withdrawn. In an embodiment, a user can be identified as having failed to participate in a required process by setting a flag in the user record 40. In another embodiment, a flag may be set in the feedback column 73 of the transaction record table 60 indicating that a user has not participated in the dispute resolution process for this transaction. Then, when such a user submits feedback, the feedback cancellation criteria evaluator 604 will check the pertinent user record and/or transaction record to determine if that user has failed to participate in a required process. If a flag is set in either or both records indicating that the user has failed to participate in UPI, INR, or some other process, the feedback cancellation criteria evaluator 604 may signal to the feedback cancellation recorder 608 to mark that comment as a removed/non-scored feedback so that that feedback is not displayed and/or does not affect a user's rating (i.e., total positive 80, total negative 78, or total score 76). In another embodiment, the feedback cancellation recorder 608 may mark that feedback as non-scoring (i.e., the feedback comment is displayed), and an administrative message indicating such may be displayed alongside the feedback. When the system determines that a user has not participated in an online dispute resolution procedure, the system checks to see if the user has previously left feedback relating to the involved transaction, and the system removes/non-scores that previously left feedback. In an embodiment, the feedback cancellation recorder 608 removes/non-scores feedback by marking each relevant feedback comment as removed/non-scored (e.g., by indicating such in the type column 108 and/or by recording the removal/non-scoring date in the withdrawal date column 120 in the feedback details table 53), updating feedback scores (e.g., total score 76, total negative 78 and total positive 80 in the feedback table 52), and marking the transaction as having removed/non-scored feedback (e.g., in the feedback column 73 of the transaction record table 60).

FIG. 8 illustrates an example user interface that displays feedback, feedback statistics, and an administrative message in connection with non-scored feedback. Specifically, feedback statistics 810 reports a user's feedback statistics including the positives 811, neutrals 812, and negatives 813. It further reports a percentage of positive feedback at 814. FIG. 8 further illustrates a feedback comment at 820, a reply to that comment at 821, and an administrative message at 822 indicating that the user who left the original feedback did not participate in a dispute resolution process. FIG. 8 further illustrates that, in this embodiment, while positive ratings are indicated by other users at 823, there is no indication of positive, negative, or neutral at 824 for this user who left the feedback but who did not participate in the online dispute resolution process.

The feedback UI generator 612 is responsible for generating various user interfaces (UIs) that present feedback information to the users such as the user interface illustrated in FIG. 8. In an embodiment, the feedback UI generator 612 determines that certain feedback has been removed/non-scored by checking the type 108 in the feedback details table 53 associated with the particular feedback. As explained supra, if a user has failed to participate in either the INR, the UPI, or some other transaction facility process, the feedback submitted by that user may be removed/non-scored by indicating in the feedback details table 53 that the type 108 is a removal or non-score, and indicating the date of such removal or non-score in 120.

In another embodiment, if a user has been suspended from the facility 10 within a certain period of time (e.g., 90 days) of that user's first activity in the facility, or the user has been indefinitely suspended within a certain time period (e.g., 90 days) of leaving the feedback, feedback for that user may be removed/non-scored. The indication that a user has been suspended within a certain time period may be indicated in that user's user record 40. Then, if that user leaves feedback, that feedback may be marked as removed/non-scored by the feedback cancellation criteria evaluator 604 and the feedback cancellation recorder 608 will remove/non-score that feedback (type 108 in feedback details table 53). As with the embodiments relating to INR and UPI, this removal/non-scoring may or may not affect the display of the comment 820, and may or may not affect the statistics 810.

Figure 7:
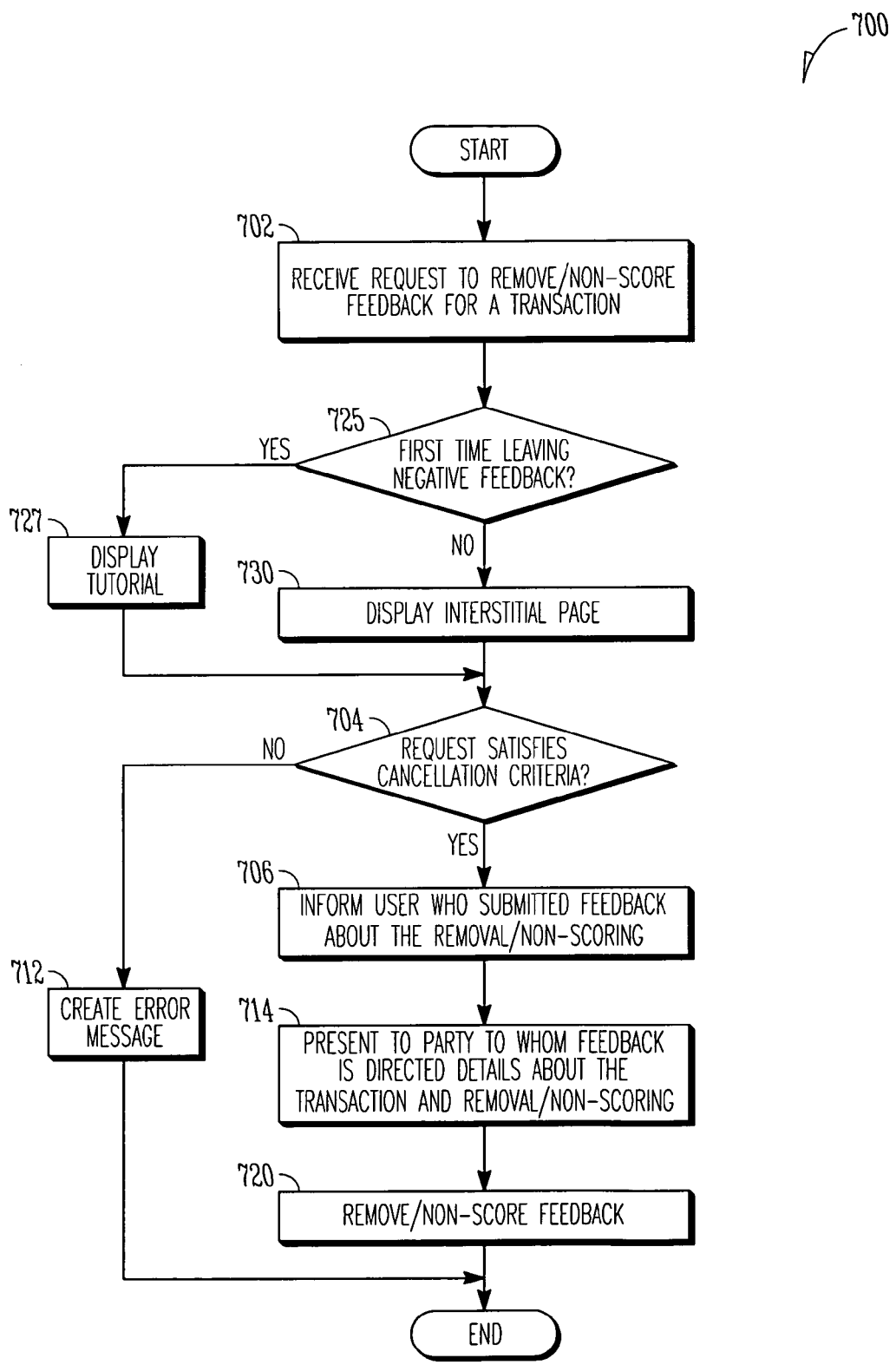
FIG. 7 is a flow diagram of an exemplary method performed by the feedback cancellation module.

FIG. 7 is a flow diagram of one embodiment of a method 700 for removing/non-scoring feedback in a network-based transaction facility. The method may be performed by the feedback cancellation module 600, which may be implemented in hardware, software, or a combination of both.

Referring to FIG. 7, method 700 begins with the feedback cancellation request receiver 602 receiving a request to cancel feedback (processing block 702). This request is initiated by the transaction facility 10 when a user who has submitted the feedback has failed to participate in the INR, UPI, or other system process for this transaction, or the user who has submitted the feedback has been suspended within a certain time period (e.g., 90 days) of his or her first activity, or indefinitely suspended within a certain time period (e.g., 90 days) of leaving the feedback. In one embodiment, the request includes an item identifier that links the request to a specific transaction. In addition, the feedback cancellation request receiver 602 may use the item number to determine the other party to the transaction and to retrieve all feedback comments for this transaction.

In an embodiment, after receiving the request to withdraw feedback at processing block 702, the feedback cancellation request receiver 602 determines at processing block 725 if this is the first time that this user has ever left negative or neutral feedback. If it is, the facility 10 presents a short tutorial to the user at processing block 727 relating to the effects of leaving negative or neutral feedback, and suggesting alternatives to feedback. Some sample pages of such a tutorial is illustrated in FIG. 9a through FIG. 9f. If the user has previously submitted negative or neutral feedback, the facility 10 presents to the user at processing block 730 a short interstitial page reminding the user of the effects of leaving negative or neutral feedback, and once again suggesting alternatives to leaving feedback. An example of such an interstitial page is illustrated in FIG. 10.

At processing block 704, the feedback cancellation criteria evaluator 604 determines whether the feedback cancellation request satisfies a set of feedback cancellation criteria. As discussed above, the set of feedback cancellation criteria are based on rules that may require, for example, that a user submitting feedback have properly participated in an online process such as a dispute resolution procedure (such as UPI or INR), or the rules may require that a user has not been suspended within a certain time period, for example 90 days, of being registered as a user, or indefinitely suspended within a certain period of time of leaving the feedback.

If the feedback cancellation request does not satisfy any of the feedback cancellation criteria, the criteria evaluator 604 creates an error message identifying the problem (processing block 712). If the feedback cancellation request satisfies all of the feedback cancellation criteria, the feedback cancellation request processor 606 informs the user who submitted the feedback that the feedback has been removed/non-scored and the reason for that removal/non-scoring (processing block 706). In another embodiment, the feedback cancellation request processor 606 sends to the user to whom the feedback is directed an email specifying that feedback was submitted, the transaction that the feedback pertains to, the feedback left for this transaction, and that this feedback has been removed/non-scored (processing block 714). In other embodiments, the user to whom the feedback is directed may be notified about the feedback using different communication means (e.g., a letter, a voice message, etc.).

If the criteria evaluator 604 determines that the cancellation criteria have been satisfied, the feedback cancellation request processor 606 causes the feedback cancellation recorder 608 to remove/non-score the feedback (processing block 720). In one embodiment, the feedback is removed/non-scored by marking each relevant feedback comment as removed/non-scored, recalculating feedback scores and statistics of both parties, and marking the transaction as having removed/non-scored feedback to prevent the party who has not yet provided feedback from leaving new feedback. As previously mentioned, in an embodiment, the result of removed feedback is that the feedback comment is not displayed to users, and the result of non-scored feedback is that while the comment is still displayed to users, that feedback is not counted in the feedback statistics.

In an embodiment, the feedback cancellation request receiver 602 receives an item number provided by the user during that user's submission of the feedback, and the cancellation request receiver 602 attempts to identify the transaction and the other user to the transaction based on the item number. If the item number is associated with multiple transactions and multiple second users (e.g., the user submitting the feedback is a seller who has multiple buyers of the same item), the feedback cancellation request receiver 602 determines that further identification of the transaction is required and retrieves information pertaining to the multiple transactions from the database 610. In an embodiment, the feedback UI generator 612 presents to the user submitting the feedback a list of transactions relating to the item number submitted by the user, and the user can select the transaction for which he would like to leave feedback. Alternatively, if the item number is associated with a single transaction, the feedback cancellation request receiver 602 retrieves information about this transaction from the database 610.

In addition to checking whether the user has properly participated in dispute resolution procedures, and whether the user has been suspended within a certain time period of his or her first activity (or indefinitely suspended within a certain amount of time of leaving the feedback), in an embodiment, the criteria evaluator 604 may further determine whether other feedback withdrawal criteria are satisfied. Such criteria may include whether a valid item number was entered, or whether the user was a party to this transaction.

In an embodiment, if the user has multiple transactions for the same item, the user has previously left feedback for one or more of those transactions, and the currently entered feedback for that user is removed/non-scored from the system (e.g., because the user has just been suspended), the feedback for each of those transactions will be removed/non-scored at that same time.

Computer System

Figure 11:
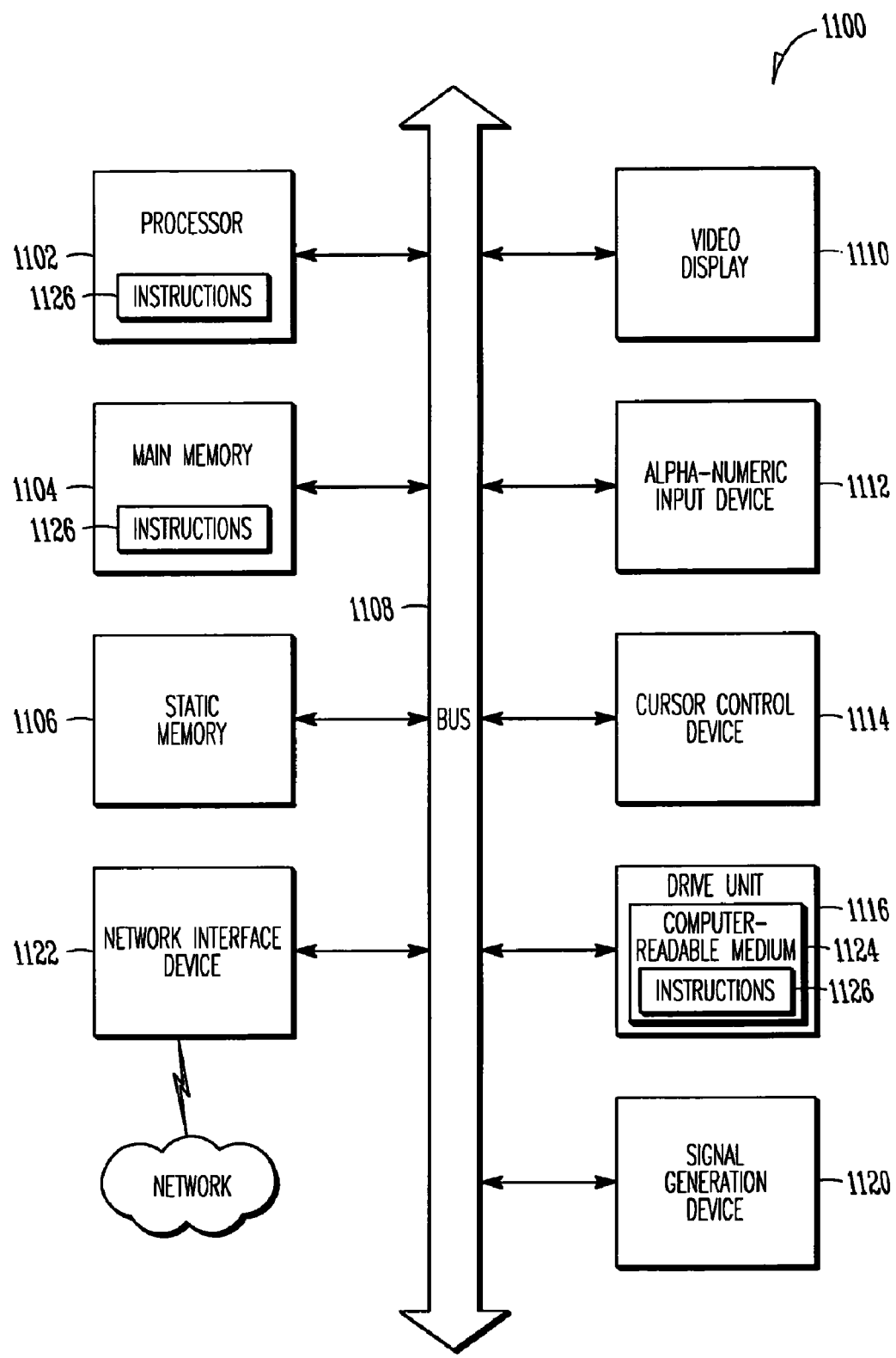
FIG. 11 is a block diagram of an exemplary computer system that may be used to practice embodiments of the present invention.

FIG. 11 shows a diagrammatic representation of a machine in the exemplary form of a computer system 1100 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1100 includes a processor 1102, a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alpha-numeric input device 1112 (e.g. a keyboard), a cursor control device 1114 (e.g. a mouse), a disk drive unit 1116, a signal generation device 1120 (e.g. a speaker) and a network interface device 1122.

The disk drive unit 1116 includes a machine-readable medium 1124 on which is stored a set of instructions (i.e., software) 1126 embodying any one, or all, of the methodologies described above. The software 1126 is also shown to reside, completely or at least partially, within the main memory 1104 and/or within the processor 1102. The software 1126 may further be transmitted or received via the network interface device 1122. For the purposes of this specification, the term "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to include, but not be limited to, solid-state memories, optical disks and magnetic disks.

Thus, a method and system for canceling feedback in a network-based transaction facility have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. An apparatus comprising:
   at least one processor;
   a feedback cancellation request receiver that is executable by said processor to receive a request to cancel feedback left by a user pertaining to a transaction in a network-based transaction facility;
   a feedback cancellation criteria evaluator that is executable by said processor to determine whether one or more feedback cancellation criteria are satisfied;
   a feedback cancellation recorder that is executable by said processor to cancel said feedback by marking said feedback pertaining to said transaction as non-scored responsive to said one or more feedback cancellation criteria being satisfied; and
   a feedback user interface generator that is executable by said processor to generate a user interface that presents a plurality of feedback, said presentation of the plurality of feedback includes said feedback pertaining to said transaction presented as non-scored and other feedback presented as scored.

2. The apparatus of claim 1, further comprising:
   a feedback cancellation request processor to determine whether said user has previously left feedback pertaining to said transaction, and wherein
   said feedback cancellation recorder cancels said previously left feedback.

3. The apparatus of claim 2, wherein said feedback cancellation request processor informs a party of said transaction of said cancelled feedback.

4. The apparatus of claim 1, wherein said feedback cancellation criteria includes whether said user has participated in a dispute resolution procedure and wherein said dispute resolution procedure includes a communication by said user that said user has not received an item that said user has ordered using said network-based transaction facility.

5. The apparatus of claim 1, wherein said feedback cancellation criteria includes whether said user has participated in a dispute resolution procedure and wherein said dispute resolution procedure includes a communication by said user that said user has not received payment for an item that said user has sold using said network-based transaction facility.

6. The apparatus of claim 1, wherein said feedback cancellation criteria includes said user being suspended within a second time period, the second time period being initiated by said user initially using said facility and wherein said first and second time periods comprise at least 90 days.

7. The apparatus of claim 1, wherein said feedback user interface generator is to generate a tutorial for said user when said user leaves negative or neutral feedback for the first time.

8. The apparatus of claim 7, wherein said feedback user interface generator is to generate an interstitial page informing said user about effects of leaving negative or neutral feedback, and further wherein said interstitial page suggests alternatives to feedback.

9. The apparatus of claim 1, wherein said feedback cancellation criteria evaluator further is to determine whether a valid item number has been entered, and whether said valid item number relates to more than one transaction.

10. The apparatus of claim 1, wherein said feedback cancellation recorder is to remove the feedback pertaining to the transaction by marking the feedback pertaining to the transaction as removed.

11. The apparatus of claim 10, wherein said removal comprises:
marking said feedback so that said feedback is not displayed to users; and
recalculating feedback scores and statistics for each party to said transaction.

12. The apparatus of claim 1, wherein said feedback user interface generator is to generate a user interface that presents a system administrator message that indicates that said feedback has been withdrawn; and wherein said feedback cancellation recorder is to recalculate feedback statistics if said feedback statistics were previously updated based on said feedback.

13. The apparatus of claim 1, wherein said feedback cancellation request receiver is to determine that more than one transaction is associated with said item number, and further wherein said feedback cancellation request receiver is to access a database to identify the correct transaction.

14. A computer-implemented method comprising:
receiving, via a network, a request to cancel feedback left by a user pertaining to a transaction in a network-based transaction facility;
automatically determining whether one or more feedback cancellation criteria are satisfied, said determining done through said use of at least one processor;
automatically canceling the feedback pertaining to said transaction responsive to the one or more feedback cancellation criteria being satisfied, said cancelling done through said use of at least one processor, said canceling including marking said feedback pertaining to said transaction as non-scored; and
generating a user interface presenting a plurality of feedback, said presenting said plurality of feedback including presenting said feedback pertaining to said transaction as non-scored and presenting other feedback that is scored.

15. The computer-implemented method of claim 14, further comprising:
determining whether said user has previously left feedback pertaining to said transaction; and
canceling said previously left feedback.

16. The computer-implemented method of claim 15, further comprising informing a party of said transaction of said canceled feedback.

17. The computer-implemented method of claim 14, wherein said feedback cancellation criteria includes whether said user has participated in a dispute resolution procedure and wherein said dispute resolution procedure includes a communication by said user that said user has not received an item that said user has ordered using said network-based transaction facility.

18. The computer-implemented method of claim 14, wherein said feedback cancellation criteria includes whether said user has participated in a dispute resolution procedure and wherein said dispute resolution procedure includes a communication by said user that said user has not received payment for an item that said user has sold using said network-based transaction facility.

19. The computer-implemented method of claim 14, said feedback cancellation criteria includes said user being suspended within a second time period, the second time period being initiated by said user initially using said facility and wherein said first and second time periods comprises at least 90 days.

20. The computer-implemented method of claim 14, further comprising generating a tutorial for said user when said user leaves negative or neutral feedback for the first time.

21. The computer-implemented method of claim 20, further comprising generating an interstitial page informing said user about the effects of leaving negative or neutral feedback and suggesting alternatives to said feedback.

22. The computer-implemented method of claim 14, further comprising determining whether a valid item number has been entered, and whether said item number relates to more than one transaction.

23. The computer-implemented method of claim 14, further wherein said canceling the feedback pertaining to the transaction includes removing the feedback by marking the feedback pertaining to the transaction as removed.

24. The computer-implemented method of claim 23, wherein said removing comprises:
marking said feedback so that said feedback is not displayed to users; and
recalculating feedback scores and statistics for each party to said transaction.

25. The computer-implemented method of claim 14, wherein said generating further comprises
generating said user interface presenting a system administrator message indicating that said feedback pertaining to said transaction has been withdrawn; and further comprising:
recalculating feedback statistics if said statistics were previously updated base on score associated with said feedback comment.

26. The computer-implemented method of claim 14, further comprising determining that more than one transaction is associated with said item number, and accessing a database to identify the correct transaction.

27. A computer system comprising:
a memory; and
a processor, coupled to the memory, to receive a request to cancel feedback pertaining to a transaction in a network-based transaction facility, said processor to determine whether one or more feedback cancellation criteria are satisfied, said processor to cancel said feedback by marking said feedback pertaining to said transaction as non-scored responsive to the determination that one or more feedback cancellation criteria are satisfied, said processor to generate a user interface that presents a plurality of feedback, said plurality of feedback includes said feedback pertaining to said transaction presented as non-scored and other feedback presented as scored.

28. The computer system of claim 27, wherein said feedback cancellation criteria includes whether said user has participated in a dispute resolution procedure and wherein said dispute resolution procedure comprises a communication by said user that said user has not received an item that said user has ordered using said computer system.

29. The computer system of claim 27, wherein said feedback cancellation criteria includes whether said user has participated in a dispute resolution procedure and wherein said dispute resolution procedure comprises a communication by said user that said user has not received payment for an item that said user has sold using said computer system.

30. A tangible non-transitory computer readable medium comprising instructions, which when executed on a processor, cause said processor to:
receive, via a network, a request to cancel feedback left by a user that pertains to a transaction in a network-based transaction facility;
automatically determine whether one or more feedback cancellation criteria are satisfied;
automatically cancel said feedback that pertains to said transaction responsive to said one or more feedback cancellation criteria determined as satisfied, said automatic cancel is to mark said feedback that pertains to said transaction as non-scored; and generate a user interface to present a plurality of feedback, the presentation of the plurality of feedback includes said feedback that pertains to said transaction presented as non-scored and other feedback presented as scored.

31. An apparatus comprising:

first means for receiving a request to cancel feedback left by a user pertaining to a transaction in a network-based transaction facility;

second means for determining whether one or more feedback cancellation criteria are satisfied; and third means for automatically canceling said feedback pertaining to said transaction responsive to the determining said one or more feedback cancellation criteria are satisfied, said automatic canceling including marking said feedback pertaining to said transaction as non-scored; and a fourth means for generating a user interface that presents a plurality of feedback, said presentation of the plurality of feedback includes said feedback that pertains to said transaction presented as non-scored and other feedback presented as scored.

\* \* \* \* \*